United States Patent
Bonino et al.

(10) Patent No.: US 12,491,674 B2
(45) Date of Patent: Dec. 9, 2025

(54) PROCESS FOR MAKING A CONTAINER OF A GIVEN SHAPE FROM SHEET MATERIAL

(71) Applicant: SOREMARTEC S.A., Senningerberg (LU)

(72) Inventors: Claudio Bonino, Senningerberg (LU); Giovanni Bonino, Senningerberg (LU)

(73) Assignee: SOREMARTEC S.A., Senningerberg (LU)

( * ) Notice: Subject to any disclaimer, the term of this patent is extended or adjusted under 35 U.S.C. 154(b) by 142 days.

(21) Appl. No.: 17/927,489

(22) PCT Filed: May 11, 2021

(86) PCT No.: PCT/IB2021/054002
§ 371 (c)(1),
(2) Date: Nov. 23, 2022

(87) PCT Pub. No.: WO2021/240280
PCT Pub. Date: Dec. 2, 2021

(65) Prior Publication Data
US 2023/0202092 A1  Jun. 29, 2023

(30) Foreign Application Priority Data
May 28, 2020 (IT) .................. 102020000012772

(51) Int. Cl.
*B29C 49/42* (2006.01)
*B29C 49/48* (2006.01)
(Continued)

(52) U.S. Cl.
CPC .... *B29C 49/42454* (2022.05); *B29C 49/4802* (2013.01); *B31B 50/592* (2018.05);
(Continued)

(58) Field of Classification Search
CPC ... B29C 49/42; B29C 49/48; B29C 49/42454; B29C 49/4802; B29C 45/14; B31B 50/59; B31B 50/592; B29L 2031/7132
See application file for complete search history.

(56) References Cited

U.S. PATENT DOCUMENTS 5,366,685 A * 11/1994 Fujii ................ B29C 51/225
425/388
7,658,882 B2 * 2/2010 Minganti .............. B29C 51/02
425/529
(Continued)

FOREIGN PATENT DOCUMENTS

DE      203 19 528 U1      3/2004
JP      H05253965      * 10/1993 ............ B29C 45/14

OTHER PUBLICATIONS

JPH05253965 English translation prepared Jun. 4, 2024 (Year: 2024).*
(Continued)

*Primary Examiner* — John J DeRusso
*Assistant Examiner* — Shibin Liang
(74) *Attorney, Agent, or Firm* — ROTHWELL, FIGG, ERNST & MANBECK, P.C.

(57) ABSTRACT

Process for obtaining a container of a given shape starting from sheet material, by providing a sheet; providing a mould having a forming cavity, which defines a reference axis (R) and has a shape corresponding to the given shape of the container; positioning the sheet over forming cavity; providing a forming device having forming structure arranged on a side of the sheet opposite the forming cavity, and operating the structure for inserting the sheet into the forming cavity to deform it until a container blank is obtained having a shape approximating the given shape; and blowing a gas under pressure into the forming cavity to
(Continued)

Figure 1A:
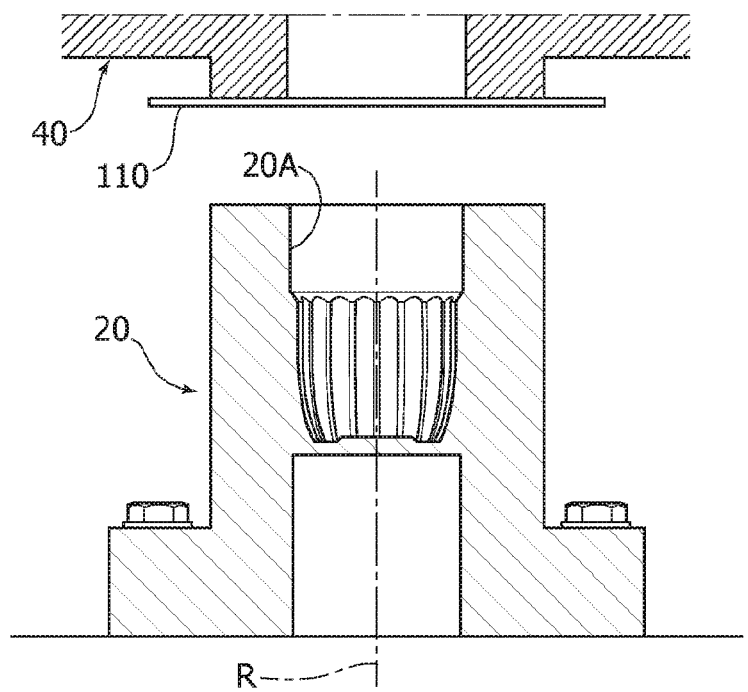
Figure 1B:
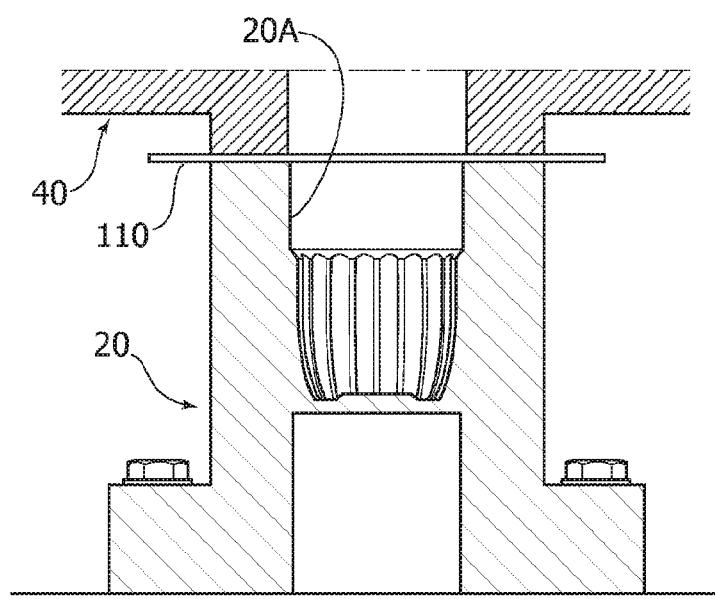

deform the container blank until the container with the given shape is obtained.

16 Claims, 6 Drawing Sheets

(51) Int. Cl.
    *B31B 50/59*     (2017.01)
    *B29L 31/00*     (2006.01)
    *B31B 110/20*     (2017.01)

(52) U.S. Cl.
    CPC .. *B29C 2791/001* (2013.01); *B29C 2791/007* (2013.01); *B29L 2031/7132* (2013.01); *B31B 2110/20* (2017.08)

(56) References Cited

U.S. PATENT DOCUMENTS

2015/0336152 A1     11/2015     Yamagata et al.
2018/0022012 A1     1/2018     Rapparini

OTHER PUBLICATIONS

Italian Search Report issued for Italian Patent Application No. IT202000012772 on Jan. 27, 2021, 8 pages.
International Search Report and Written Opinion issued for International Application No. PCT/IB2021/054002, on Aug. 6, 2021, 11 pages.

\* cited by examiner

PROCESS FOR MAKING A CONTAINER OF A GIVEN SHAPE FROM SHEET MATERIAL

CROSS REFERENCE TO RELATED APPLICATION(S)

This application is a 35 U.S.C. 371 National Phase Entry Application from PCT/IB2021/054002 filed May 11, 2021, which claims priority to Italian Application No. 102020000012772, filed May 28, 2020. The entirety of the disclosures of the above-referenced applications are incorporated herein by reference.

TEXT OF THE DESCRIPTION

The present invention regards a process for obtaining a container of a given shape from sheet material, of the type comprising the steps of:
provide a sheet;
providing a mould having a forming cavity, which defines a reference axis and has a shape corresponding to said given shape of said container;
positioning said sheet over said forming cavity;
providing a forming device having forming means arranged on the side of said sheet opposite to said forming cavity, and operating said means for inserting said sheet into said forming cavity to deform it until a container blank is obtained having a shape approximating said given shape; and
blowing a gas under pressure into said forming cavity to deform said container blank until said container of said given shape is obtained.

As is known in the art, the process in question is a process of hot forming of the sheet constituting the starting material, where, first, the forming device operates to provide a substantial deformation of the sheet in order to obtain a blank of the container, and then gas under pressure is blown into the forming cavity to model the blank so that it will assume the final shape of the container.

The above type of process is widely used in the industrial field for packaging products of various types, being a consolidated and reliable technique.

However, the adoption in a very large number of sectors of containers having increasingly complex shapes has increased considerably the problems to be tackled for implementation of the process referred to. For instance, there are very widespread configurations of containers that have elaborate profiles in various directions, for example along the height of the container and along its circumference.

A problem that arises with complex shapes of the type referred to regards the capacity to guarantee that the sheet will be deformed at the same time preventing any excessive thinning-out in each of the various portions of the container formed, which would render the container subject to lack of structural homogeneity such as to vitiate the mechanical and physical characteristics thereof.

Today, this problem is solved, where possible, using sheet materials having an oversized thickness.

In this context, the object of present invention is to provide a solution that will be improved as compared to the prior art, in particular one that will make it possible to use less material, i.e., a sheet of small thickness, for production of the container.

The above object is achieved using a process having the characteristics recalled in claim 1.

The annexed claims form an integral part of the technical teaching provided herein.

Figure 1C:
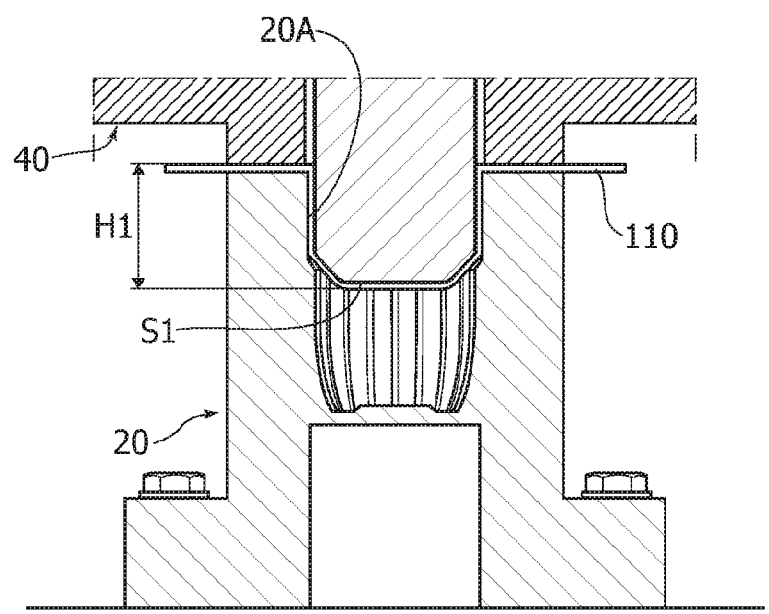
Figure 1D:
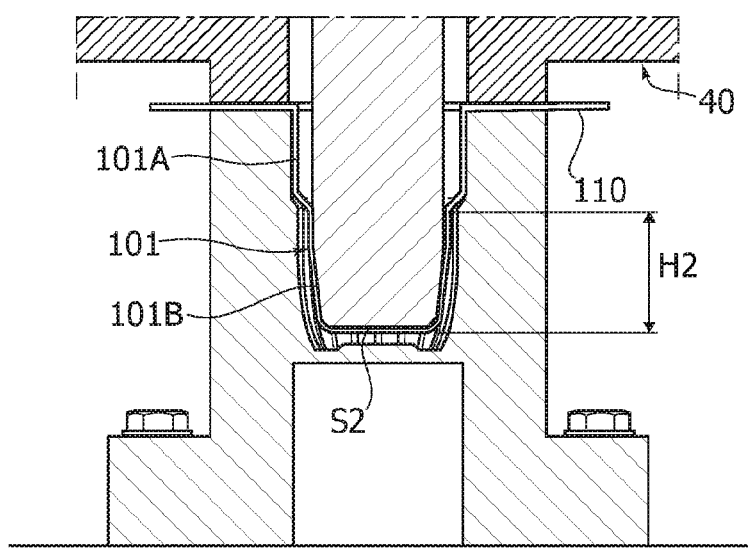

Further characteristics and advantages of the present invention will emerge clearly from the ensuing description and the annexed drawings, wherein:
FIGS. 1A-1E are a schematic illustration of the process described herein according to one example of implementation;
FIG. 2 illustrates an example of container obtained with the process described herein; and
FIGS. 3A-3E illustrate the process described herein according to a further example of implementation.

In the ensuing description various specific details are illustrated, aimed at enabling an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As mentioned above, the solution described herein regards a process for obtaining a container of a given shape starting from sheet material. The type of material used may be of a thermoformable or deformable type, for example plastic resins, paper, polymeric material, aluminium, etc., alone or in combination.

In particular, the solution described herein refers to the field of containers made of polymeric material.

With reference to FIGS. 1A-1E and 2, these illustrate an example of application of the solution described herein to obtain a container, designated as a whole by the reference number 100, which has a given height H and extends along the dimension of height, identifying a first portion 100A and a second portion 100B that have a different shape and different dimensions.

In particular, the portion 100A, which is located closer to the mouth 100' of the container, has a roughly cylindrical conformation and extends for a height H1. The portion 100B, which terminates on the bottom of the container, has a smaller cross section with undulated profile and with dimensions that vary along the height H. More in particular, the portion 100B comprises a first stretch 100B' with substantially constant cross section, and a second stretch 100B" with cross section decreasing downwards. As a whole, the portion 100B extends for a height H2.

Figure 1E:
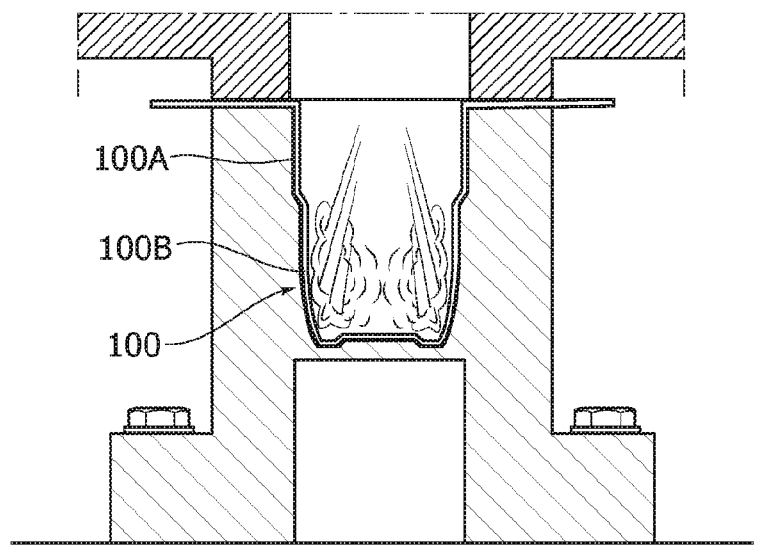
Figure 2:
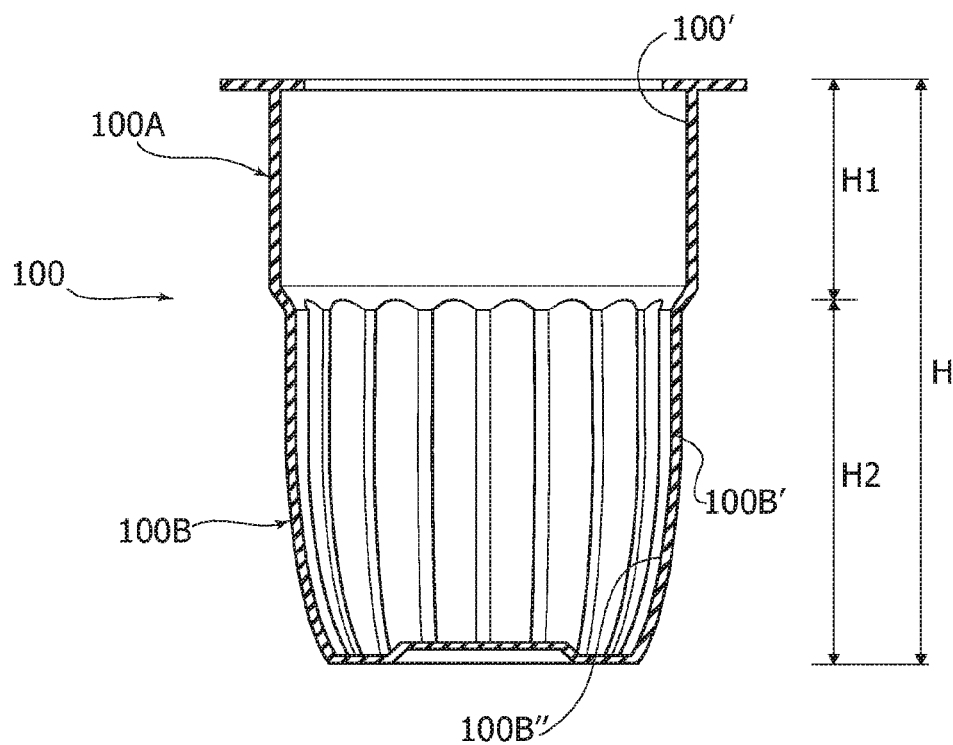

To obtain a container of this sort starting from sheet material, the process described herein envisages, in general, the steps of:
providing a sheet 110;
providing a mould 20 having a forming cavity 20A, which defines a reference axis R and has a shape corresponding to the shape referred to of the container 100 (FIG. 1A);
positioning the sheet 110 over the forming cavity 20A (FIG. 1B);
providing a forming device 40 having forming means arranged on the side of the sheet 110 opposite to the forming cavity 20A, and operating the forming means for inserting the sheet 110 into the forming cavity 20A to deform it until a container blank is obtained having a shape that approximates the shape of the container 100 (FIGS. 1C and 1D); and
blowing a gas under pressure into the forming cavity 20A to deform the container blank 101 until the container 100 with the shape referred to is obtained (FIG. 1E).

The process described herein is characterized in that the step of insertion of the sheet 110 into the forming cavity 20A by the forming device 40 envisages at least two distinct steps (FIGS. 1C and 1D). In the first step, the sheet 110 is pushed by a first operating surface S1 of a forming member, which approximates, as regards dimensions, the section of the portion 100A of the container, and is inserted into the forming cavity 20A for a stretch substantially corresponding to the height H1 of the portion 100A (FIG. 1C). In the second step, the sheet 110 is pushed by a second operating surface S2 of a forming member, smaller than the surface S1, which approximates, as regards dimensions, the smaller section of the portion 100B of the container, and is further inserted into the forming cavity 20A for a stretch substantially corresponding to the height H2 of the portion 100B (FIG. 1D). The surfaces S1 and S2 operate on the sheet coming completely into contact therewith.

As illustrated in FIG. 1D, at the end of the step of formation of the sheet 110 by the forming device 40, the container blank 101 obtained has two portions distinct from one another 101A, 101B, which reproduce, in a rough and approximate way, the portions 100A, 100B of the container.

The next step of the process, which envisages blowing gas under pressure into the forming cavity, completes forming of the sheet 110 urging it against the entire inner surface of the forming cavity 20A so that it assumes the exact same shape thereof, which corresponds to the shape of the container 100 (FIG. 1E).

In general, it should be noted that the step of preliminary forming of the sheet by the forming device 40 may also envisage a number of steps greater than two, on the basis of the shape of the container to be obtained; the step in question may for example envisage three or four steps, and use of a corresponding number of operating surfaces, of dimensions progressively decreasing from one step to the next, as described above.

The present applicant has been able to verify that execution, in the two (or more) distinct steps referred to, of the step of forming of the sheet by the forming device 40 makes it possible to improve the degree of homogeneity of the structure of the container 100.

In particular, it may be noted that the differences of thickness in the different points of the container are considerably smaller than those that can be found in containers obtained via conventional forming processes.

Without wishing to provide here any theoretical treatment, the present applicant has in any case reason to believe that the effect found of a greater homogeneity of the structure of the container can be put down to the fact that the division of the process of deformation of the sheet into two (or more) distinct steps, of which the first step is carried out via an operating surface S1 greater than that of the second step (and that of the further steps, if these are envisaged), makes it possible to distribute the sheet material, in terms of thickness, in a more uniform way between the top and bottom portions of the container formed. In this way, formation, in the container, of portions that are considerably thinner and weaker or more brittle than others is prevented.

For the reasons referred to, the process described herein enables use of sheet materials of small thickness as compared to known processes.

On the other hand, the greater degree of homogeneity of the structure of the container obtained evidently constitutes an improvement of the quality of the container itself and moreover affords a prolongation of the shelf life of the end product.

The process described herein hence leads to benefits in terms of saving of material, reduction in the production costs, and reduction of the environmental impact of the containers obtained. Moreover, the process described herein makes it possible to use new materials that cannot be used with conventional processes and to provide shapes that up to now have been difficult to obtain with current systems.

In general, the process described herein can be used for providing containers of any shape so that the shape of the container is not to be understood as in any way limiting the inventive solution disclosed herein. In this connection, it may be noted that the shapes, dimensions, and dimensional ratios of the two surfaces S1 and S2 may be selected according to the specific applications.

The process described herein may envisage pre-heating of the sheet to be formed or else cold execution of the steps of forming the sheet, this according to the type of material (thermoformable or deformable) constituting the sheet and/or the shape of the container to be obtained.

With reference now to FIGS. 3A-3E, these illustrate in greater detail the forming means of the forming device 40 and modes of operation thereof according to a preferred embodiment of the solution described herein. The process may in any case envisage the use of forming means different from the ones illustrated hereinafter.

According to this embodiment, the forming device 40 comprises a first forming member 41 and a second forming member 42, which are mounted inside one another in a telescopic way and are prearranged for co-operating with the forming cavity 20A of the mould 20. Incidentally, it will be noted that the example illustrated in the figures regards an application in which the mould 20 is provided with a plurality of forming cavities 20A and, likewise, the forming device 40 is provided with a corresponding number of pairs of forming members 41, 42 designed to co-operate with the plurality of cavities 20A.

With reference to the single pair of members 41, 42, they have one and the same main axis of extension that is aligned with the reference axis R of the corresponding forming cavity 20A.

The two members 41, 42 are mobile along the reference axis R, both fixedly and according to a relative motion, for carrying out the two distinct steps illustrated above of the step of forming the sheet via the device 40.

In particular, for execution of the first step, the two members 41, 42 move into a condition where the ends 41A, 42A thereof are substantially aligned to form as a whole the first operating surface S1 mentioned above (FIG. 3B).

In the example illustrated, the end 42A of the outer member 42 has a substantially conical conformation and, in the condition mentioned, sets itself in a position slightly set back with respect to the end 41A of the forming member 41, so as to constitute an ideal prolongation of the chamfered perimetral edge of the end 41A.

In any case, the above configuration derives from the requirements of the specific application.

The effective area, which is important for the action discussed herein, of the operating surface S1 is represented by its projection in a plane orthogonal to the reference axis R.

Figure 3A:
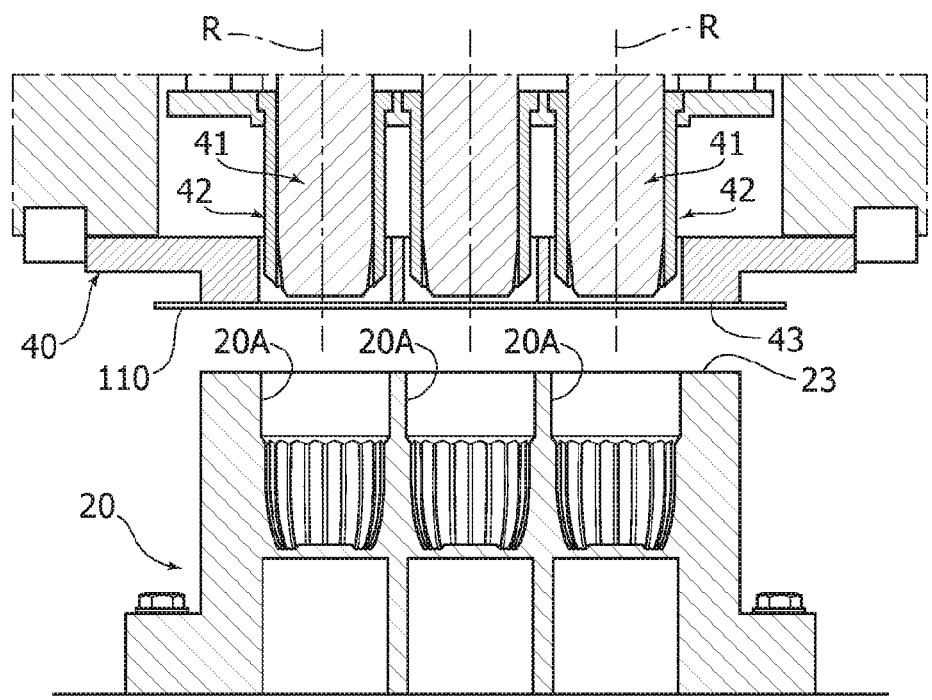
Figure 3B:
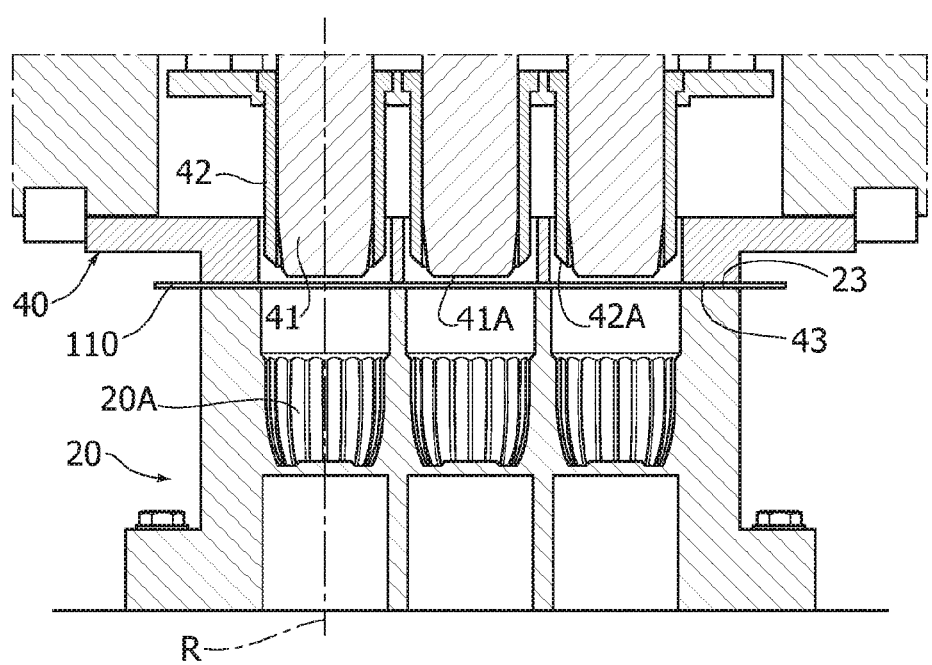
Figure 3C:
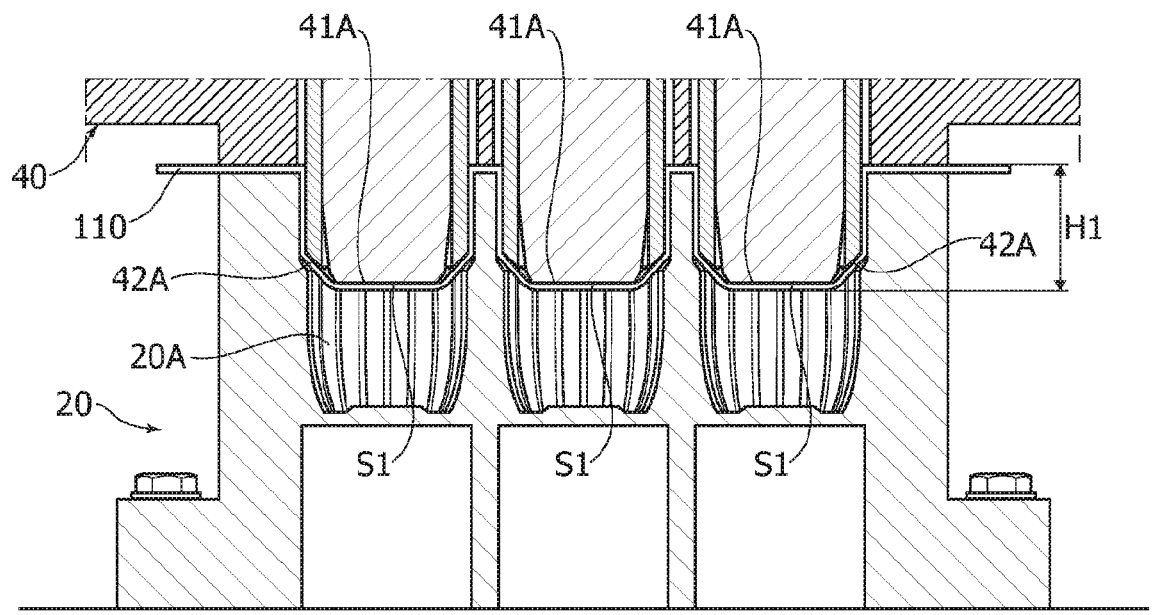

In the condition referred to, the two members 41, 42 approach the sheet 110, which is gripped between a top surface 23 of the mould 20 and a bottom surface 43 of the forming device 40 and push it by way of the operating surface S1 into the forming cavity 20A, for a first stretch of length substantially corresponding to the height H1 (FIG. 3C).

At the end of the travel of the two members 41, 42, the portion 101A of the container blank 101 is thus formed on the sheet 110.

Figure 3D:
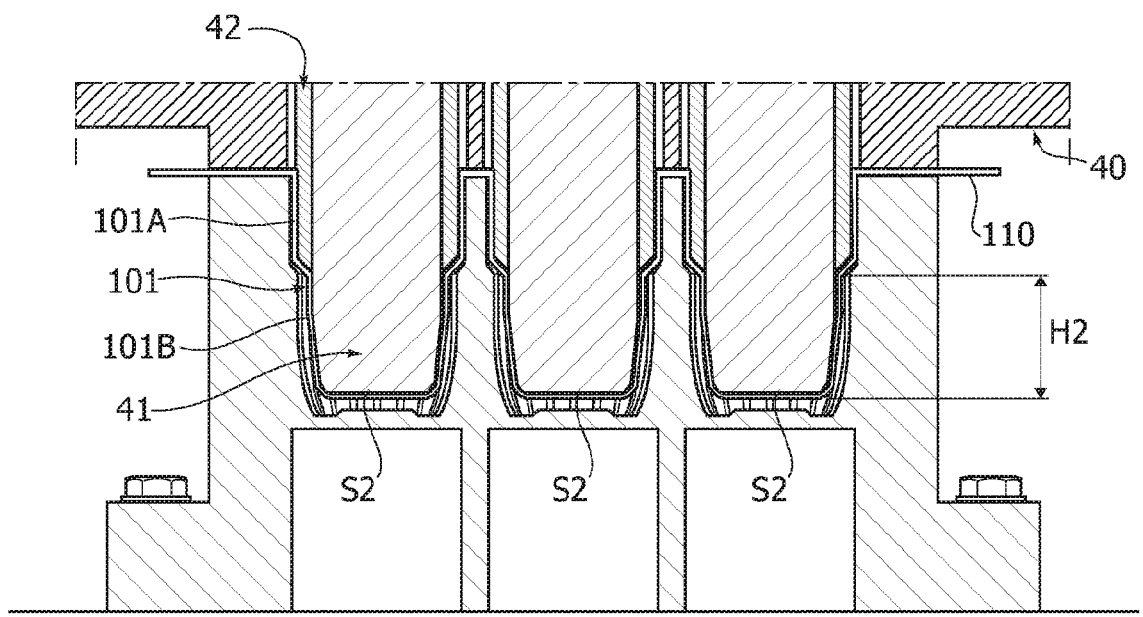

Next, the forming member 41 alone performs a further movement along the reference axis R, for a stretch of length substantially corresponding to the height H2 until it reaches the bottom of the forming cavity 20A (FIG. 3D). During this movement of the member 41, the member 42 remains stationary in the position reached at the end of the first step.

Movement of the member 41 enables extraction thereof from the outer member 42, and the member 41 thus performs, by itself, an action of thrust on the sheet 110 through its end 41A, which defines the operating surface S2 referred to above for the second step.

The operating surface S2 evidently has an effective area, with respect to an action of thrust along the reference axis R, that is smaller than that of the surface S1, being defined by just the inner member 41.

The action of the member 41 enables formation of the portion 101B of the container blank 101 and corresponds to the second step of the forming process.

At the end of this second step, the container blank 101 is completed (FIG. 3D).

Figure 3E:
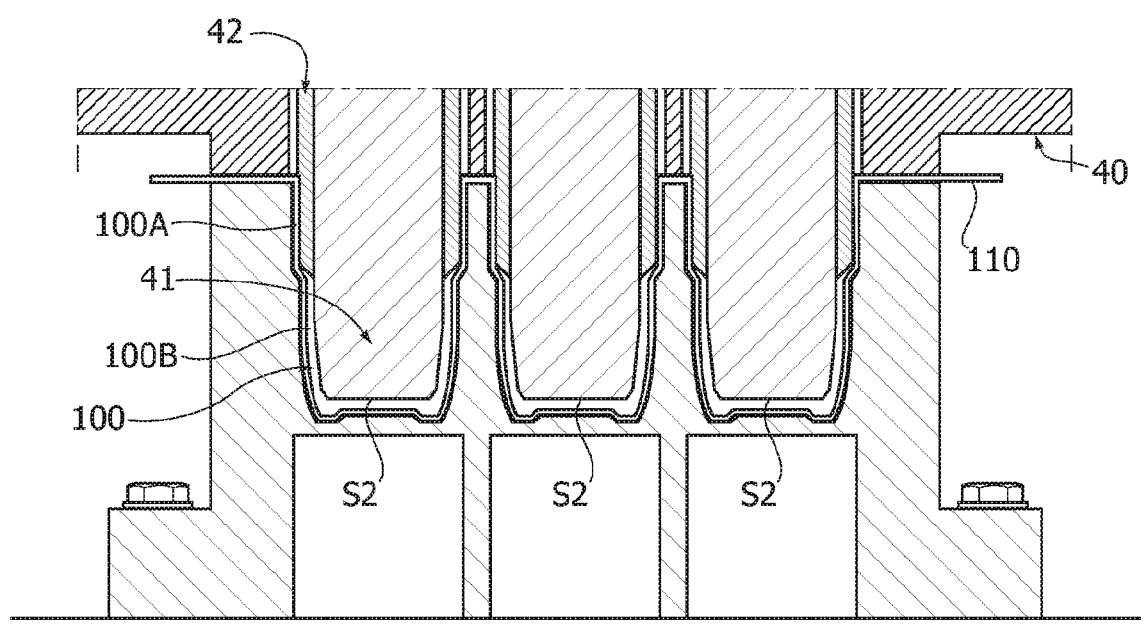

At this point, gas under pressure is blown into the forming cavity 20A for completion of the container 100 (FIG. 3E).

Incidentally, it may be noted that, in general, the blowing step can in any case also be started during the first movement of the two forming bodies 41, 42 or else during the second movement of just the forming body 41, this according to the specific applications.

This step can be performed according to conventional modalities, so that further details are not provided herein.

The two forming members 41, 42 are associated to a driving system that is able to activate the two members simultaneously or separately as illustrated above. In general, the driving system mentioned may comprise two independent driving devices, each for governing one of the two forming members 41, 42.

Such a system can be obtained according to different configurations on the basis of the specific applications.

As anticipated above, the process described herein may envisage forming means different from the ones illustrated above. For instance, instead of providing two forming members coupled together and co-operating in the way illustrated above, it is possible to provide two independent forming members, one of which defines the operating surface S1 and the other the operating surface S2. On the other hand, with reference to the solution illustrated, it should be noted that the mutual arrangement of the two members 41 and 42 may vary according to the specific applications, in particular according to the particular shapes of the containers to be obtained. For instance, the two members 41 and 42 could be arranged simply alongside one another and not mounted inside one another. In some embodiments, the forming device 40 comprises a thermal-conditioning system (heating or cooling means), associated to one or both of the forming members 41, 42, to keep the corresponding ends 41A, 42A at pre-set temperatures. This system may, for example, include an electrical resistance and a thermostat for controlling electrical supply to the resistance.

A preferred application of the process described herein regards production of containers in aseptic environment.

The process described herein has been devised specifically for applications in the field of the foodstuff industry, but the same may advantageously be used also in any other sector, for example in the pharmaceutical field, and in the fields of hygiene-health products, cosmetics, toys, etc.

Of course, without prejudice to the principle of the invention, the details of construction and the embodiments may vary, even significantly, with respect to what has been illustrated herein purely by way of non-limiting example, without thereby departing from the scope of the invention, as defined in the annexed claims.

The invention claimed is:

1. A process for obtaining a container (100) of a given shape from sheet material, comprising the steps of:
   providing a sheet (110);
   providing a mould (20) having a forming cavity (20A), which defines a reference axis (R) and has a shape corresponding to said given shape of said container (100);
   positioning said sheet (110) over said forming cavity (20A);
   providing a forming device (40) having a forming member (41, 42) arranged on the side of said sheet opposite to said forming cavity, and inserting said sheet (110) into said forming cavity (20A) by said forming member to deform it until a container blank is obtained (101) having a shape approximating said given shape; and
   blowing a gas under pressure into said forming cavity (20A) to deform said container blank (101) until said container (100) with said given shape is obtained;
   said process being characterized in that said step of inserting said sheet (110) into said forming cavity includes:
   setting in contact with said sheet a first operating surface (S1) of the forming member (41, 42) and pushing through said first operating surface (S1) said sheet (110) into said forming cavity (20A), for a first stretch (H1) along said reference axis (R), wherein said sheet is deformed as a result of said pushing through said first operating surface (S1) said sheet (110) into said forming cavity (20A), for a first stretch (H1) along said reference axis (R); and
   further pushing said sheet (110) into said forming cavity (20A) by way of a second operating surface (S2) of the forming member (41, 42), which is of smaller size than said first surface (S1), for a second stretch (H2) along said reference axis (R), wherein said sheet is further deformed as a result of said further pushing said sheet (110) into said forming cavity (20A) by way of a second operating surface (S2) of the forming member (41, 42), which is of smaller size than said first surface (S1), for a second stretch (H2) along said reference axis (R);
   providing, through said first operating surface (S1), a first portion (101A) of said container blank (101), which extends along said first stretch (H1) and has a cross section determined by said first operating surface (S1); and
   providing, through said second operating surface (S2), a second portion (101B) of said container blank (101), which extends along said second stretch (H2) and has a cross section determined by said second operating surface (S2),
   wherein the section transverse to said reference axis (R) of said first portion (101A) is of larger size than the cross section of said second portion (101B),
   and wherein a first region of the second portion has substantially constant cross section, and a second region of the second portion has a cross section that decreases downward.

2. The process according to claim 1, wherein said forming member comprises a first forming member (41) and a second forming member (42) that can be driven along said reference axis (R) separately or simultaneously, said process including:

setting said first and second forming members (41, 42) substantially in one and the same position along said reference axis (R) so that they define together said first operating surface (S1);

in this condition, feeding said first and second forming members (41, 42) in a fixed way with respect to one another along said reference axis (R), for said first stretch (H1); and keeping said first forming member (42) stationary and further feeding said second forming member (41) along said reference axis (R), for said second stretch (H2), one end (41A) of said second member defining said second operating surface (S2).

3. The process according to claim 2, which includes blowing gas into said forming cavity (20A) in a condition where said first forming member (42) is positioned at the end of said first stretch (H1), and said second forming member (41) is positioned at the end of said second stretch (H2); and/or blowing gas into said forming cavity (20A) during movement of said first and second forming members (42, 41) along said first stretch (H1); and/or blowing gas into said forming cavity (20A) during movement of said second forming member (41) along said second stretch (H2).

4. The process according to claim 2, wherein said forming device (40) comprises a thermal-conditioning system to keep said first forming members (41) and/or said second forming member (42) at a pre-set temperature.

5. The process according to claim 1, wherein, in said forming device (40):

said first and second forming members (41, 42) are mounted inside one another in a telescopic way; and said first forming member (42) has a tubular conformation, and said second forming member (41) has a cylindrical conformation, said first and second members (41, 42) presenting the corresponding axes aligned with said reference axis;

said process including:

setting corresponding ends (41A, 42A), facing said mould cavity (20A), of said first and second forming members (41, 42) substantially in one and the same position along said reference axis (R) to form said first operating surface (S1), in said condition, feeding said first and second forming members (41, 42) along said reference axis (R) in a fixed way with respect to one another, for said first stretch (H1); and keeping said first forming member (42) stationary, and feeding said second forming member (41) further along said reference axis (R), for said second stretch (H2), getting said second forming member (41) to project from said first forming member (42).

6. The process according to claim 1, wherein along said reference axis (R) a given height of said container (100) is determined, subtended between its mouth edge (100') and its bottom, and wherein, on said container (100), along said reference axis (R), a first portion (100A) and a second portion (100B) distinct from one another are determined, said first portion (100A) presenting a section transverse to said reference axis (R) of larger size than the cross section of said second portion (100B).

7. The process according to claim 1, wherein said sheet may be made of thermoformable or deformable material.

8. The process according to claim 7, wherein said sheet may be made of one or more of plastic resins, paper, polymeric material, and aluminium.

9. The process according to claim 1, wherein said sheet is heated prior to said forming steps.

10. A process for obtaining a container (100) of a given shape from sheet material, comprising the steps of:

providing a sheet (110);

providing a mould (20) having a forming cavity (20A), which defines a reference axis (R) and has a shape corresponding to said given shape of said container (100);

positioning said sheet (110) over said forming cavity (20A);

providing a forming device (40) having a first forming member (41) and a second forming member (42) arranged on the side of said sheet opposite to said forming cavity, and operating said first and second forming members for inserting said sheet (110) into said forming cavity (20A) to deform it until a container blank is obtained (101) having a shape approximating said given shape; and blowing a gas under pressure into said forming cavity (20A) to deform said container blank (101) until said container (100) with said given shape is obtained;

said process being characterized in that said step of inserting said sheet (110) into said forming cavity includes:

gripping said sheet between a top surface of said mould and a bottom surface of the forming device;

setting in contact with said sheet a first operating surface (S1) of said first and second forming members (41, 42) and pushing through said first operating surface (S1) said sheet (110) into said forming cavity (20A), with respect to said top and bottom surfaces, for a first stretch (H1) along said reference axis (R), wherein said sheet is deformed as a result of said pushing through said first operating surface (S1) said sheet (110) into said forming cavity (20A), with respect to said top and bottom surfaces, for a first stretch (H1) along said reference axis (R); and further pushing said sheet (110) into said forming cavity (20A) by way of a second operating surface (S2) of said first and second forming members (41, 42), which is of smaller size than said first surface (S1), with respect to said top and bottom surfaces, for a second stretch (H2) along said reference axis (R), wherein said first and second forming members (41, 42) can be driven along said reference axis (R) separately or simultaneously and wherein said sheet is further deformed as a result of said further pushing said sheet (110) into said forming cavity (20A) by way of a second operating surface (S2) of a forming member (41, 42), which is of smaller size than said first surface (S1), with respect to said top and bottom surfaces, for a second stretch (H2) along said reference axis (R), said process including:

setting said first and second forming members (41, 42) substantially in one and the same position along said reference axis (R) so that they define together said first operating surface (S1);

in this condition, feeding with respect to said top and bottom surfaces said first and second forming members (41, 42) in a fixed way with respect to one another along said reference axis (R), for said first stretch (H1); and keeping said first forming member (42) stationary and further feeding said second forming member (41) along said reference axis (R), with respect to said top and bottom surfaces, for said second stretch (H2), one end (41A) of said second member defining said second operating surface (S2), wherein, in said forming device (40):

said first and second forming members (41, 42) are mounted inside one another in a telescopic way; and said first forming member (42) has a tubular conformation, and said second forming member (41) has a cylindrical conformation, said first and second members (41, 42) presenting the corresponding axes aligned with said reference axis;

said process including:

setting corresponding ends (41A, 42A), facing said mould cavity (20A), of said first and second forming members (41, 42) substantially in one and the same position along said reference axis (R) to form said first operating surface (S1), in said condition, feeding said first and second forming members (41, 42) with respect to said top and bottom surfaces, along said reference axis (R), in a fixed way with respect to one another, for said first stretch (H1); and keeping said first forming member (42) stationary, and feeding said second forming member (41) with respect to said top and bottom surfaces, further along said reference axis (R), for said second stretch (H2), getting said second forming member (41) to project from said first forming member (42).

11. The process according to claim 10, which includes blowing gas into said forming cavity (20A) in a condition where said first forming member (42) is positioned at the end of said first stretch (H1), and said second forming member (41) is positioned at the end of said second stretch (H2); and/or blowing gas into said forming cavity (20A) during movement of said first and second forming members (42, 41) along said first stretch (H1); and/or blowing gas into said forming cavity (20A) during movement of said second forming member (41) along said second stretch (H2).

12. The process according to claim 10, wherein along said reference axis (R) a given height of said container (100) is determined, subtended between its mouth edge (100') and its bottom, and wherein, on said container (100), along said reference axis (R), a first portion (100A) and a second portion (100B) distinct from one another are determined, said first portion (100A) presenting a section transverse to said reference axis (R) of larger size than the cross section of said second portion (100B).

13. The process according to claim 10, wherein said sheet may be made of thermoformable or deformable material.

14. The process according to claim 13, wherein said sheet may be made of one or more of plastic resins, paper, polymeric material, and aluminium.

15. The process according to claim 10, wherein said sheet is heated prior to said forming steps.

16. The process according to claim 10, wherein said forming device (40) comprises a thermal-conditioning system to keep said first forming members (41) and/or said second forming member (42) at a pre-set temperature.

* * * * *